United States Patent [19]
Shiba

[11] Patent Number: 6,038,851
[45] Date of Patent: Mar. 21, 2000

[54] EXHAUST RE-COMBUSTION TYPE COMBINED CYCLE POWER GENERATION PLANT

[75] Inventor: Akio Shiba, Yokohama, Japan

[73] Assignee: Kabushiki Kaisha Toshiba, Kawasaki, Japan

[21] Appl. No.: 09/123,555

[22] Filed: Jul. 29, 1998

[30] Foreign Application Priority Data

Jul. 31, 1997 [JP] Japan ................................. P9-206629

[51] Int. Cl.$^7$ ...................................................... F02C 6/00
[52] U.S. Cl. ....................................................... 60/39.182
[58] Field of Search ................................. 60/39.182, 653, 60/679

[56] References Cited

U.S. PATENT DOCUMENTS 4,507,914 4/1985 Rice ...................................... 60/39.182
5,471,832 12/1995 Sugita et al. .......................... 60/39.182

*Primary Examiner*—Noah P. Kamen
*Attorney, Agent, or Firm*—Oblon, Spivak, McClelland, Maier & Neustadt, P.C.

[57] ABSTRACT

An exhaust re-combustion type combined cycle power generation plant comprises a gas turbine plant, a boiler connected to the gas turbine plant, in which an exhaust gas from the gas turbine plant is heated, a steam turbine plant connected to the boiler and provided with a condensate and feed water system and a low temperature reheat system, in which the heated exhaust gas from the boiler is supplied to the condensate and feed water system as a heat source, a cooling steam supply system connected to the low temperature reheat system and adapted to supply a cooling steam to the high temperature section of the gas turbine plant, and a cooling steam recovery system connected to the high temperature section for recovering the cooling steam after cooling the high temperature section to an intermediate stage of an intermediate turbine of the steam turbine plant. The power generation plant further includes a bypass system connected to the cooling steam recovery system for bypassing the cooling steam from the cooling steam recovery system to a condenser of the condensate and feed water system and includes a secondary cooling steam recovery system for joining the cooling steam after the cooling together with a turbine extraction steam supplied from a steam turbine section of the steam turbine plant to the condensate and feed water system.

5 Claims, 4 Drawing Sheets

EXHAUST RE-COMBUSTION TYPE COMBINED CYCLE POWER GENERATION PLANT

BACKGROUND OF THE INVENTION

The present invention relates to an exhaust re-combustion type (combustion stabilizing type) combined cycle power generation plant, which combines a gas turbine plant and a steam turbine plant arranged independently from each other in their axes.

Nowadays, a combined cycle power generation plant operated as a practical plant includes an exhaust re-combustion type in addition to an exhaust heat recovery type. The exhaust re-combustion type combined cycle power generation plant is constructed in a manner that a gas turbine plant and a steam turbine plant are arranged in their axes independently from each other but operatively connected to each other, which includes a case where both the gas turbine plant and the steam turbine plant are newly founded and also includes a case of combining the existing steam turbine plant with a newly founded gas turbine plant, so-called re-powering system used as a feed water heating cycle. The exhaust re-combustion type combined cycle power generation plant incorporating such re-powering system is excellent in the following points. That is, such plant has a simple system, makes great a power factor of the steam turbine and is adaptable to a power increase of the existing power generation plant. Thus, this plant is applicable to some thermal power generation plants.

FIG. 4 shows a configuration of a conventional power plant.

Referring to FIG. 4, a reference numeral 1 denotes the whole configuration of a conventional exhaust re-combustion type combined cycle power generation plant including a gas turbine plant 2, a boiler 3 and a re-heat type steam turbine plant 4.

The gas turbine plant 2 includes a power generator 5, an air compressor 6, a gas turbine combustor 7 and a gas turbine B. An air sucked by the air compressor 6 is compressed therein to a high pressure, and then, the high pressure air (pressurized air) is guided to the gas turbine combustor 7. Further, a fuel is added in the gas turbine combustor 7 to the high pressure air to generate a combustion gas, which is then expanded by the gas turbine 8 so that the power generator 5 can be driven by a rotating torque generated by the expansion of the combustion gas.

The gas turbine plant 2 guides the combustion gas expanded by the gas turbine 8 to the boiler 3 as an exhaust gas G to heat the exhaust gas G by the combustion gas of the boiler 3.

On the other hand, the re-heat type steam turbine plant 4 includes a steam turbine section 9 and a condensate and feed water system 10.

The steam turbine section 9 is constructed in a manner that a high pressure turbine 11, an intermediate pressure turbine 12, a low pressure turbine 13 and a power generator 14 are mutually connected directly in their axes. That is, the driving shafts or rotating shafts thereof are operatively connected. A main steam MS supplied from the boiler 3 is expanded by the high pressure turbine 11, and then, the turbine exhaust gas is heated by a reheater 15, and further, is guided into the intermediate pressure turbine 12 as a reheated steam RS. After being expanded, the turbine exhaust gas is again expanded by the low pressure turbine 13 so that the power generator 14 can be driven by a rotating torque generated accompanying with the expansion of the turbine exhaust gas.

The condensate and feed water system 10 includes a condenser 16, a low pressure feed water heater 17, a deaerator 18, a high pressure feed water heater 19, a low pressure gas cooler 20 arranged in parallel with the low pressure feed water heater 17, and a high pressure gas cooler 21 arranged in parallel with the high pressure feed water heater 19. The turbine exhaust gas from the low pressure turbine 13 is condensed into a condensate water CW by the condenser 16, and then, the condensate water CW makes a heat-exchange with a turbine extraction steam ES from the low pressure turbine 13 by the low pressure feed water heater 17 so as to be reproduced into a feed water FW. Further, the feed water FW is mixed with the turbine extraction steam ES from the low pressure turbine 13 so as to be heated and deaerated by the deaerator 18, and then, the feed water FW after heated and deaerated makes a heat-exchange with a turbine extraction steam ES from the intermediate pressure turbine 12 by the high pressure feed water heater 19 so as to be re-produced into a higher temperature feed water, and thereafter, is returned to the boiler 3.

On the other hand, in the boiler 3, the exhaust gas G supplied from the gas turbine plant 2 is heated by a boiler combustion gas, and then, the heated gas HG makes a heat-exchange with the feed water FW by the high pressure gas cooler 21, and thereafter, again makes a heat-exchange with the feed water FW by the low pressure gas cooler 20 so that the feed water can be reproduced into a higher temperature feed water.

In the manner described above, in the exhaust re-combustion type combined cycle power generation plant 1 incorporating the re-powering system of the structure mentioned above, the exhaust gas discharged from the gas turbine plant 2 is heated by the boiler 3, and then, the heated gas HG is used as a heat source to heat the feed water FW. Thus, a heat recovery can be effectively achieved, and a heat efficiency of the plant can be improved.

In the recent gas turbine plant 2, in order to achieve a higher heat efficiency and high power generation, there has been made a plan to heighten a combustion gas temperature (gas turbine inlet temperature) from usual 1100° C. to 1300° C. or 1500° C. or more.

In the gas turbine plant 2, conventionally, in order to cope with high temperature of the gas turbine, a cooling air is supplied to components of the gas turbine 8, for example, a gas turbine stationary blade, a gas turbine rotating blade, a gas turbine rotor, etc., and thus, maintenance of their component strength has been achieved. Further, a part of high pressure air generated by the air compressor 6 is utilized as the cooling air.

However, the high pressure air generated by the air compressor 6 is originally used for driving the gas turbine 8, and in the case where the part of the high pressure air generated by the air compressor 6 is used for cooling these components of the gas turbine 8, there has arisen a problem that a desired plant heat efficiency is not obtained. Further, the high pressure air generated by the air compressor 6 cools the components of the gas turbine 8, and thereafter, is joined together with a main flow (gas turbine driving gas). For this reason, the high pressure air give disturbance to the main flow, and as a result, there has arisen a problem that a blade efficiency is lowered and a desired power output is not obtained. Thus, with progress of the plan to make high temperature the gas turbine plant 2, the use of the high pressure air as a coolant for components of the gas turbine 8 has no longer given a limit in the high plant heat efficiency. Recently, a study and development of a cooling medium for components of the gas turbine 8 have been newly made, and there is a plan to use a steam having a specific heat higher than air as the cooling medium.

In the case of using a steam as the cooling medium, in the exhaust re-combustion type combined cycle power generation plant incorporating the re-powering system, from the relation of cooling the steam after making it into a proper temperature between the main flow (gas turbine driving gas) and the components of the gas turbine 8, a turbine exhaust gas (steam before being supplied to the reheater 15) of the high pressure turbine 11 is selected as the cooling medium supply source. Considering that the temperature of the main flow is more than 1300° C., the steam thus selected serves to preferably cool the components of the gas turbine 8 without generating an excessive thermal stress in the components of the gas turbine 8.

However, the steam after cooling the components of the gas turbine 8 has inconvenience and disadvantage in a plant operation if the selection of a place for recovering the steam is erroneously made. More specifically, the cooling steam flows in a serpentine shape when cooling the components of the gas turbine 8, and for this reason, a pressure loss becomes extremely large. Thus, in the exhaust re-combustion type combined cycle power generation plant 1, in order to cover a short of pressure of the turbine exhaust gas used as a cooling steam, a main steam MS supplied to the high pressure turbine 11 from the boiler 3 must be further made high pressure. This causes a disadvantage in an efficiency of the boiler. Further, a temperature of the steam which has cooled the components of the gas turbine 8 rises when cooling, and then, becomes about 550° C. The steam temperature becomes lower as compared with a reheated steam RS discharged from the reheater 15 because the reheated steam has a temperature of 600° C. If the low temperature steam is joined together with the reheated steam RS, the temperature of the reheated steam RS becomes further low, thus being not preferable in a steam turbine efficiency.

SUMMARY OF THE INVENTION

An object of the present invention is to substantially eliminate defects or drawbacks encountered in the prior art mentioned above and to provide an exhaust re-combustion type combined cycle power generation plant, capable of properly setting a place or portion for recovering a steam which has cooled components of a gas turbine so as to effectively recover a cooling steam and further improve a thermal efficiency of the plant.

This and other objects can be achieved according to the present invention by providing an exhaust re-combustion type combined cycle power generation plant comprising:

a gas turbine plant having a high temperature section;

a boiler operatively connected to the gas turbine plant, in which an exhaust gas from the gas turbine plant is heated;

a steam turbine plant operatively connected to the boiler and including high, intermediate and low pressure turbines and provided with a condensate and feed water system and a low temperature reheat system, in which the heated exhaust gas from the boiler is supplied to the condensate and feed water system as a heat source;

a cooling steam supply system connected to the low temperature reheat system of the steam turbine plant and adapted to supply a cooling steam to the high temperature section of the gas turbine plant; and a cooling steam recovery system connected to the high temperature section of the gas turbine plant for recovering the cooling steam after cooling the high temperature section to an intermediate stage of the intermediate turbine of the steam turbine plant.

In another aspect, there is further provided with a bypass system operatively connected to the cooling steam recovery system for bypassing the cooling steam from the cooling steam recovery system to a condenser of the condensate and feed water system.

In a further aspect, there is further provided with a secondary cooling steam recovery system for joining the cooling steam after the cooling together with a turbine extraction steam supplied from a steam turbine section of the steam turbine plant to the condensate and feed water system.

In this aspect, the secondary cooling steam recovery system further includes a control valve and a pressure reducing valve. The condensate and feed water system includes a low pressure feed water heater, a deaerator and a high pressure feed water heater, and a steam of the secondary cooling steam recovery system is joined together with at least one or more of turbine extraction steams supplied from either one of the intermediate pressure turbine and the low pressure turbine of the steam turbine plant to the low pressure feed water heater, the deaerator and the high pressure feed water heater of the condensate and feed water system.

According to the characteristic features of the present invention mentioned above, the exhaust re-combustion type combined cycle power generation plant includes a cooling steam supply system which diverges from the low temperature reheat system to cool the high temperature section of the gas turbine by a steam and is connected to the high temperature section of the gas turbine, and a cooling steam recovery system which recovers the steam after cooling the high temperature section of the gas turbine after joined together with at least one of the intermediate turbine, the turbine extraction steam and the condenser, and further, the recovery cooling steam is recovered in a manner of being controlled to a proper pressure and temperature. Therefore, it is possible to sufficiently cope with a high temperature gas turbine plant and to reduce a pressure loss of the cooling steam, so that a plant thermal efficiency can be further improved as compared with the conventional one.

The nature and further characteristic features will be made more clear from the following descriptions made with reference to the accompanying drawings.

DESCRIPTION OF THE PREFERRED EMBODIMENTS

Embodiments of an exhaust re-combustion type combined cycle power generation plant according to the present invention will be described hereunder with reference to the accompanying drawings.

Figure 1:
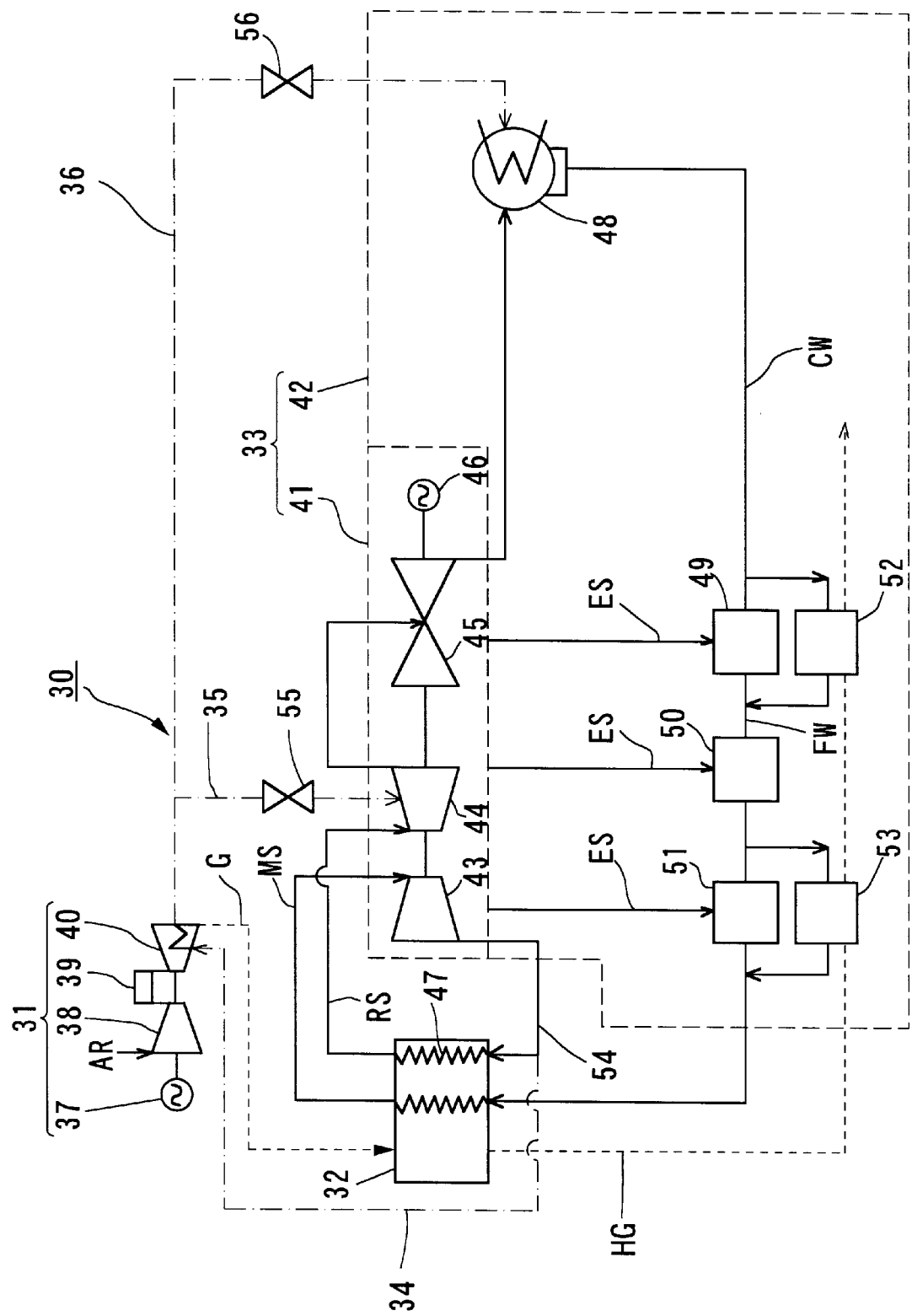
FIG. 1 is a schematic system diagram showing an exhaust re-combustion type combined cycle power generation plant according to a first embodiment of the present invention.

FIG. 1 is a schematic system diagram showing an exhaust re-combustion type combined cycle power generation plant according to a first embodiment of the present invention.

Referring to FIG. 1, an exhaust re-combustion type combined cycle power generation plant 30 according to the present invention includes a gas turbine plant 31, a boiler 32, a reheat type steam turbine plant 33, a cooling steam supply system 34, a cooling steam recovery system 35, and a bypass system 36.

The gas turbine plant 31 includes a power generator 37, an air compressor 38, a gas turbine combustor 39, and a gas turbine 40. An air AR sucked by the air compressor 38 is compressed therein to a high pressure, and then, the high pressure air (pressurized air) is guided to the gas turbine combustor 39. Further, a fuel is added in the gas turbine combustor 39 to the high pressure air to generate a combustion gas, and then, the combustion gas is expanded by the gas turbine 40 so that the power generator 37 can be driven by a rotating torque generated by the expansion of the combustion gas.

The gas turbine plant 31 guides the combustion gas expanded by the gas turbine 40 to the boiler 32 as an exhaust gas G, and then, the exhaust gas G is heated by the combustion gas of the boiler 32.

On the other hand, the reheat type steam turbine plant 33 includes a steam turbine section 41 and a condensate and feed water system 42.

The steam turbine section 41 is constructed in a manner that a high pressure turbine 43, an intermediate pressure turbine 44, a low pressure turbine 45 and a power generator 46 are mutually connected directly in their axes. That is, the driving or rotating shafts thereof are operatively connected. A main steam MS supplied from the boiler 32 is expanded by the high pressure turbine 43, and then, the turbine exhaust gas is heated by a reheater 47, and further, is guided into the intermediate pressure turbine 44 as a reheated steam RS. After being expanded, the turbine exhaust gas is again expanded by the low pressure turbine 45 so that the power generator 46 can be driven by a rotating torque generated accompanying with the expansion of the turbine exhaust gas.

The condensate and feed water system 42 includes a condenser 48, a low pressure feed water heater 49, a deaerator 50, a high pressure feed water heater 51, a low pressure gas cooler 52 arranged in parallel with the low pressure feed water heater 49, and a high pressure gas cooler 53 arranged in parallel with the high pressure feed water heater 51. The turbine exhaust gas from the low pressure turbine 45 is condensed into a condensate water CW by the condenser 16, and then, the condensate water CW is heated by a turbine extraction steam ES from the low pressure turbine 45 by the low press feed water heater 49 so as to be reproduced into a feed water FW. Further, the feed water FW is heated and deaerated by the turbine extraction steam ES from the low pressure turbine 45 with the use of a deaerator 50, and then, the feed water FW after heat/deaerated is heated by a turbine extraction steam ES from the intermediate pressure turbine 44, and thereafter, is returned to the boiler 32.

On the other hand, in the boiler 32, the exhaust gas G supplied from the gas turbine plant 31 is heated by a boiler combustion gas, and then, the heated gas HG is heated by the high pressure gas cooler 53, and thereafter, the feed water FW is again heated by the low pressure gas cooler 52.

Meanwhile, the exhaust re-combustion type combined cycle power generation plant 30 includes a cooling steam supply system 34, a cooling steam recovery system 35 and a bypass system 36. The cooling steam supply system 34 diverges from a low temperature reheat system 54 connecting an outlet of the high pressure turbine 43 and the reheater 47 of the boiler 32, and guides part of the turbine exhaust gas having a relatively low temperature to a high temperature section of the gas turbine 40, that is, to the turbine stationary blade, the turbine rotating blade, the rotor, etc. The cooling steam recovery system 35 and the bypass system 36 recover (collect) a steam after cooling the high temperature section of the gas turbine 40 to an intermediate stage of the intermediate pressure turbine 44 or to the condenser 48. Further, the cooling steam recovery system 35 and the bypass system 36 are provided with control valves 55 and 56 for controlling a flow rate of the recovery cooling steam, respectively.

As described above, in this embodiment, the cooling steam extracted from the low temperature reheat system 54 is supplied to the high temperature section of the gas turbine 40 via the cooling steam supply system 34 so as to cool the high temperature section. Thereafter, the cooling steam is recovered to the intermediate stage of the intermediate pressure turbine 44 via the cooling steam recovery system 35, and then, is jointed together with the expanding reheated steam RS by the intermediate stage of the intermediate pressure turbine 44 without making a mismatch with the temperature of the reheated steam RS. Thus, it is possible to reduce a pressure loss of the main steam MS and the reheated steam RS generated from the boiler 32.

Moreover, in this embodiment, in the case where a mismatch occurs in temperature between the reheated steam RS passing through the intermediate pressure turbine 44 and the recovery cooling steam, the recovery cooling steam is recovered to the condenser 48 via the bypass system 36. Thus, there is no generation of an excessive thermal stress based on the temperature difference in the intermediate pressure turbine 44.

Therefore, in this first embodiment, the steam after cooling the high temperature section of the gas turbine 40 is recovered to either one of the intermediate pressure turbine 44 or condenser 48 so as to prevent a temperature mismatch. Thus, the steam pressure loss is reduced, and an excessive thermal stress is not generated, so that a stable plant operation can be performed.

Figure 2:
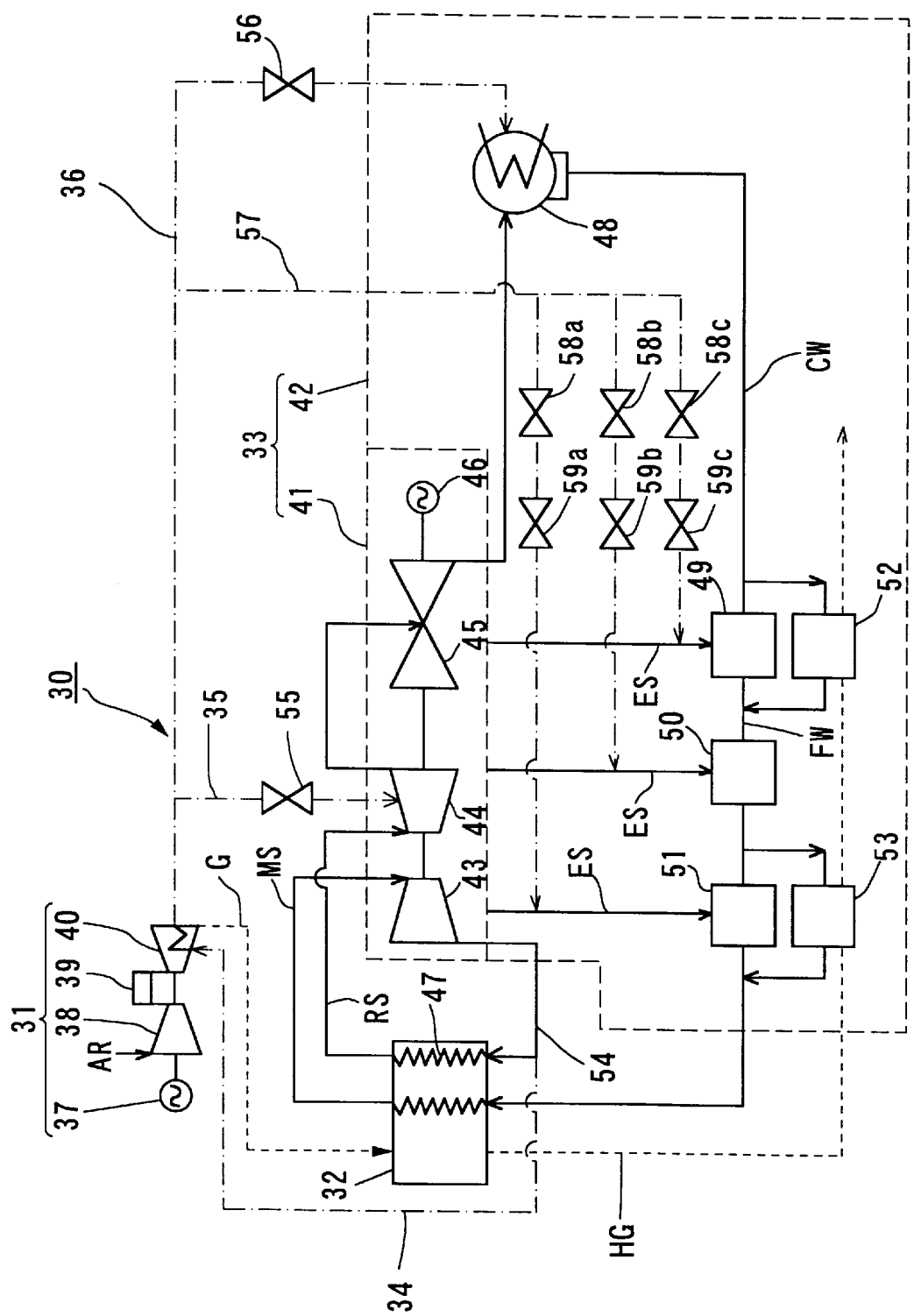
FIG. 2 is a schematic system diagram showing an exhaust re-combustion type combined cycle power generation plant according to a second embodiment of the present invention.

FIG. 2 is a schematic system diagram showing an exhaust re-combustion type combined cycle power generation plant according to a second embodiment of the present invention, in which like reference numerals are used to designate the same components as the first embodiment or the corresponding parts thereto.

In this second embodiment, there is provided a secondary (subordinate) cooling steam recovery system 57, which recovers the steam after cooling the high temperature section of the gas turbine 40 after being joined together with at least one or more turbine extraction steams ES supplied to the low pressure feed water heater 49, the deaerator 50 and the high pressure feed water heater 51 from the steam turbine section 41 in addition to the intermediate pressure turbine 44 and the condenser 48.

The secondary cooling steam recovery system 57 is provided with control valves 58a, 58b and 58c and pressure reducing valves 59a, 59b and 59c. In the event that the pressure of the recovery cooling steam becomes high, the flow rate of the cooling steam is controlled by the control valves 58a, 58b and 58c, and the pressure thereof is reduced by the pressure reducing valves 59a, 59b and 59c, and thus, the cooling steam is joined together with each turbine extraction steam ES after it coincides with the pressure of each turbine extraction steam ES. Furthermore, in the case where the temperature of the recovery cooling steam becomes very high, the bypass system 36 will be used.

As described above, in this second embodiment, the recovery cooling steam is recovered in a manner that the pressure of the recovery cooling steam coincides with at least one or more the turbine extraction steams ES supplied to the low pressure feed water heater 49, the deaerator 50 and the high pressure feed water heater 51 from the steam turbine section 41. Thus, it is possible to more effectively perform heat recovery as compared with the conventional heat recovery and to improve heat efficiency.

Figure 3:
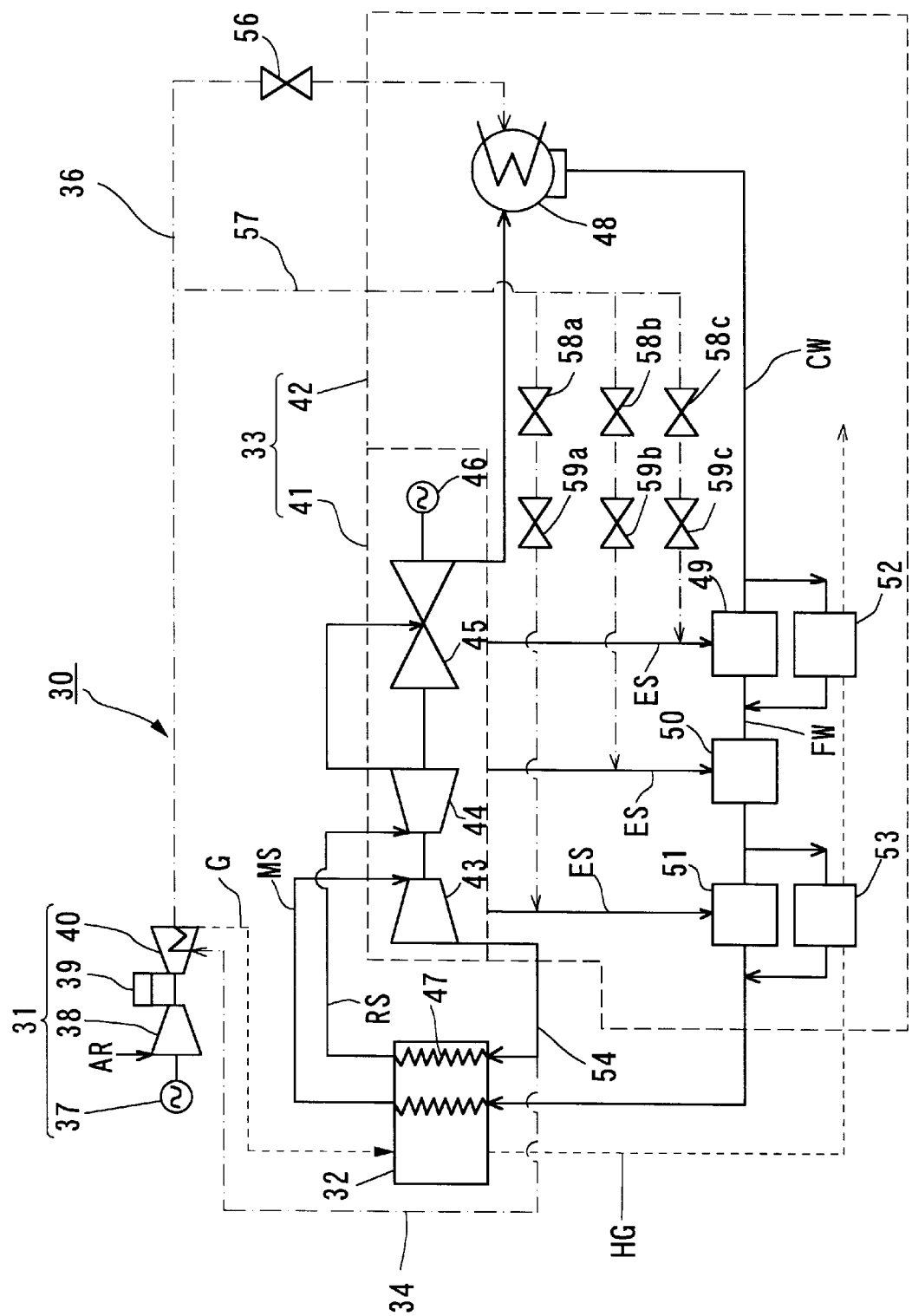
FIG. 3 is a schematic system diagram showing an exhaust re-combustion type combined cycle power generation plant according to a third embodiment of the present invention.
Figure 4:
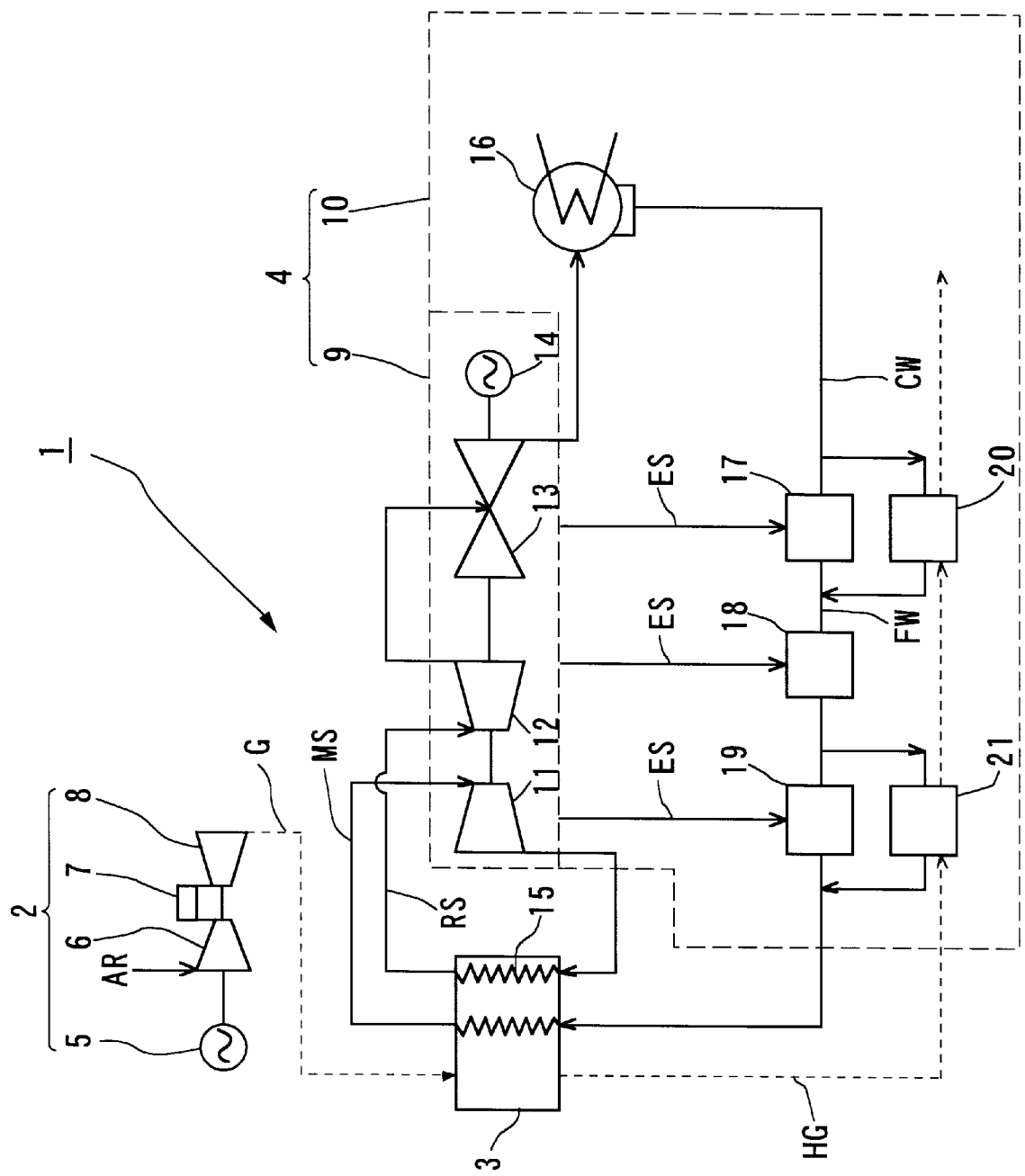
FIG. 4 is a schematic system diagram showing a conventional exhaust re-combustion type combined cycle power generation plant.

FIG. 3 is a schematic system diagram showing an exhaust re-combustion type combined cycle power generation plant according to a third embodiment of the present invention, in which like reference numerals are used to designate the same components as the first embodiment or the corresponding parts thereto.

In the aforesaid first embodiment, the steam after cooling the high temperature section of the gas turbine 40 has been recovered to the intermediate pressure turbine 44. In place of this operation, in this third embodiment, the steam is recovered after being joined together with at least one or more turbine extraction steams ES supplied to the low pressure feed water heater 49, the deaerator 50 and the high pressure feed water heater 51 from the steam turbine section 41 via the secondary cooling steam recovery system 57, and further, is recovered to the condenser 48 via the bypass system 36. The secondary cooling steam recovery system 57 is provided with control valves 58a, 58b and 58c and pressure reducing valves 59a, 59b and 59c, like the second embodiment. In the event that the pressure of the recovery cooling steam becomes high, the steam is recovered in a manner that the flow rate of the steam is controlled while the pressure thereof being reduced. Furthermore, in the case where the pressure and temperature of the cooling recovery steam are very high, the bypass system 36 will be used.

As described above, in this third embodiment, the recovery cooling steam has been recovered to the turbine extraction steam ES. Thus, it is possible to economize a fuel spent for the boiler 32 and to further improve plant heat efficiency as compared with the conventional one.

It is to be noted that the present invention is not limited to the described embodiments and many other changes and modifications may be made without departing from the scopes of the appended claims.

What is claimed is:

1. An exhaust re-combustion type combined cycle power generation plant comprising:

a gas turbine plant having a high temperature section;

a boiler operatively connected to the gas turbine plant, in which an exhaust gas from the gas turbine plant is heated;

a steam turbine plant operatively connected to the boiler and including high, intermediate and low pressure turbines, the steam turbine plant further being provided with a condensate and feed water system and a low temperature reheat system, in which the heated exhaust gas from the boiler is supplied to the condensate and feed water system as a heat source;

a cooling steam supply system connected to the low temperature reheat system of the steam turbine plant and adapted to supply a cooling steam to the high temperature section of the gas turbine plant; and a cooling steam recovery system connected to the high temperature section of the gas turbine plant for recovering the cooling steam after cooling the high temperature section to an intermediate stage of the intermediate turbine of the steam turbine plant.

2. An exhaust re-combustion type combined cycle power generation plant according to claim 1, further comprising a bypass operatively connected to the cooling steam recovery system for bypassing the cooling steam from the cooling steam recovery system to a condenser of the condensate and feed water system.

3. An exhaust re-combustion type combined cycle power generation plant according to claim 2, further comprising a secondary cooling steam recovery system for joining the cooling steam after the cooling together with a turbine extraction steam supplied from a steam turbine section of the steam turbine plant to the condensate and feed water system.

4. An exhaust re-combustion type combined cycle power generation plant according to claim 3, wherein said secondary cooling steam recovery system further comprises a control valve and a pressure reducing valve.

5. An exhaust re-combustion type combined cycle power generation plant according to claim 3, wherein said condensate and feed water system includes a low pressure feed water heater, a deaerator and a high pressure feed water heater, further comprising means for joining a steam flow of the secondary cooling steam recovery system with at least one turbine extraction steam flow supplied from either one of the intermediate pressure turbine and the low pressure turbine of the steam turbine plant to the low pressure feed water heater, the deaerator and the high pressure feed water heater of the condensate and feed water system.

* * * * *